(12) United States Patent
Erbslöh et al.

(10) Patent No.: US 10,100,808 B2
(45) Date of Patent: Oct. 16, 2018

(54) ROTOR BLADE EXTENSION BODY AND WIND TURBINE

(71) Applicant: SENVION GMBH, Hamburg (DE)

(72) Inventors: Sascha Erbslöh, Rendsburg (DE); Christoph Matthias Korjahn, Ahlefeld-Bistensee (DE); Alf Trede, Immenstedt (DE)

(73) Assignee: Senvion GmbH, Hamburg (DE)

( * ) Notice: Subject to any disclaimer, the term of this patent is extended or adjusted under 35 U.S.C. 154(b) by 398 days.

(21) Appl. No.: 14/823,463

(22) Filed: Aug. 11, 2015

(65) Prior Publication Data

US 2016/0047357 A1 Feb. 18, 2016

(30) Foreign Application Priority Data

Aug. 12, 2014 (DE) .................. 10 2014 215 966

(51) Int. Cl.
*F03D 1/06* (2006.01)
(52) U.S. Cl.
CPC ......... *F03D 1/0675* (2013.01); *F03D 1/0658* (2013.01); *F05B 2240/122* (2013.01); *F05B 2240/301* (2013.01); *F05B 2240/302* (2013.01); *Y02E 10/721* (2013.01)
(58) Field of Classification Search
CPC .............................. F03D 1/0658; F03D 1/0675
See application file for complete search history.

(56) References Cited

U.S. PATENT DOCUMENTS

| 6,910,867 | B2 | 6/2005 | Corten | |
|---|---|---|---|---|
| 8,052,394 | B2 | 11/2011 | Petsche et al. | |
| 2009/0148291 | A1* | 6/2009 | Gerber | F03D 1/0658 416/147 |
| 2011/0142636 | A1* | 6/2011 | Curtin | F03D 1/0658 416/62 |
| 2015/0132130 | A1* | 5/2015 | Brown | F03D 17/00 416/43 |
| 2016/0186722 | A1* | 6/2016 | Olesen | F03D 17/00 416/1 |
| 2017/0204834 | A1* | 7/2017 | Majumder | F03D 1/0675 |

FOREIGN PATENT DOCUMENTS

| DE | 60125172 T2 | 11/2007 | |
|---|---|---|---|
| DE | 102006017897 B4 | 3/2008 | |
| DE | 102008037605 A1 | 6/2009 | |
| DE | 202011103091 U1 | 11/2011 | |
| DE | 102011088025 A1 | 6/2013 | |
| EP | 2108819 A2 | 10/2009 | |
| EP | 2343451 A1 * | 7/2011 | .......... F03D 1/0641 |
| EP | 2514961 A1 | 10/2012 | |
| WO | 01/42647 A2 | 6/2001 | |
| WO | WO 2013014082 A2 * | 1/2013 | .......... F03D 1/0641 |
| WO | 2013171257 A1 | 11/2013 | |

* cited by examiner

*Primary Examiner* — Woody A Lee, Jr.
(74) *Attorney, Agent, or Firm* — Rankin, Hill & Clark LLP

(57) ABSTRACT

The invention relates to a rotor-blade extension body for use with a rotor blade of a rotor of a wind turbine. The rotor-blade extension body is elongate and is realized, for example, as a steel tube segment. There is a lift-generating element mounted on the circumference of the rotor-blade extension body.

5 Claims, 4 Drawing Sheets

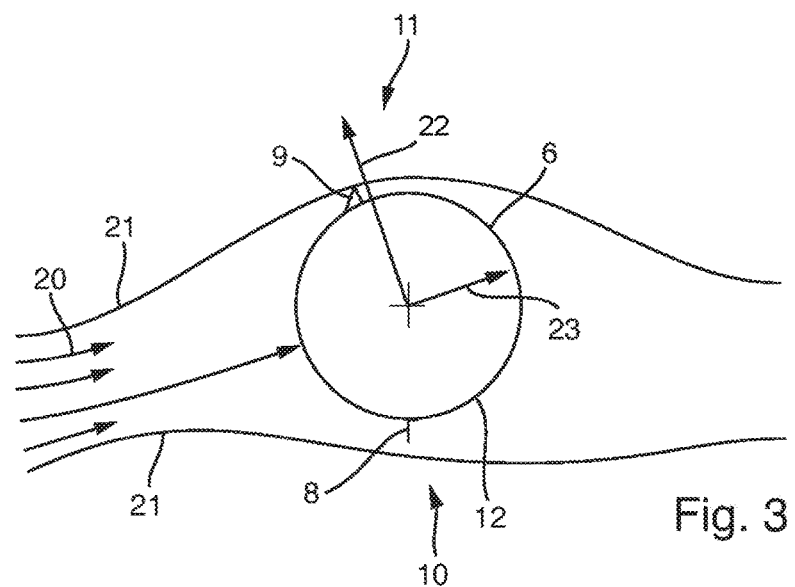
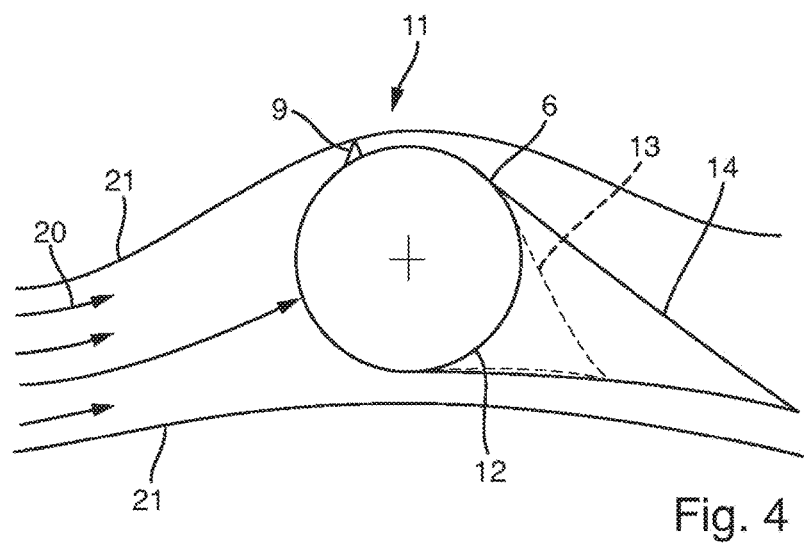

ROTOR BLADE EXTENSION BODY AND WIND TURBINE

BACKGROUND OF INVENTION

Field of Invention

The invention relates to a rotor-blade extension body for use with a rotor blade of a rotor of a wind turbine, the rotor-blade extension body being elongate. The invention additionally relates to a corresponding rotor blade having a rotor-blade extension body, and to the use of a rotor-blade extension body on a rotor blade of a wind turbine. Finally, the invention relates to a wind turbine.

Brief Description of Related Art

For the purpose of increasing the output of a wind turbine, it is known to extend the rotor blades by the use of rotor-blade extension bodies, which are usually cylindrical.

Corresponding rotor-blade extension bodies are known from WO 01/42647 A2. These purely structural rotor-blade extension bodies serve to extend the rotor blades, and thereby to enlarge the swept area of the rotor blades during rotation of the rotor comprising the rotor blades. A greater output of a corresponding wind turbine is thereby achieved. The rotor-blade extension bodies are cylindrical, however, and thus do not generate any lift at all, but instead brake the rotor, because of the drag.

The object of the present invention is to specify a rotor-blade extension body, a rotor blade having a rotor-blade extension body, and a corresponding wind turbine, with which the output can be increased in a highly efficient manner at low cost.

BRIEF SUMMARY OF THE INVENTION

This object is achieved by a rotor-blade extension body for use with a rotor blade of a rotor of a wind turbine, the rotor-blade extension body being elongate, which rotor-blade extension body is improved in that there is a lift-generating element mounted on the circumference of the rotor-blade extension body.

Owing to the rotor-blade extension body according to the invention, a rotor-blade extension body that, per se, has only a structural use, becomes a lift-generating means, as a result of which it is possible to increase the power drawn from the wind by the rotor blade on which the rotor-blade extension body is mounted. Preferably, the rotor-blade extension body is cylindrical in form, or circular in cross section. This enables the rotor-blade extension body to be mounted on a rotor-blade hub and on a rotor blade in a particularly efficient and simple manner, since the connection possibilities for this are usually also circular. The rotor-blade extension body is elongate, i.e. it has, in particular, an elongate extent, which constitutes an extension of the longitudinal axis of a rotor blade when a rotor blade and rotor-blade extension body have been connected to each other. Preferably, the rotor-blade extension body is realized as a steel tube segment.

It is particularly preferable if the lift-generating element is an eddy generator such as, for example, a vortex generator, in particular a typical vortex generator, on a suction side of the rotor-blade extension body. The suction side is assumed to be the side that constitutes the suction side when a rotor blade has been connected to the rotor-blade extension body.

Preferably, the vortex generator is mounted in a region of the surface area acted upon by the wind, i.e. in front of an angle of 90° in relation to the local incident flow direction, if an upper partial-load range of a wind turbine is used for orienting the rotor blade, or the rotor-blade extension body, i.e. before a rotor blade, and consequently the rotor-blade extension body connected to the rotor blade, is turned into the wind.

Use of a vortex generator on the suction side of the rotor-blade extension body achieves a turbulent flow of air that flows around downstream from the vortex generator, as a result of which the drag on the suction side is reduced, and consequently lift is generated in the direction of the suction side. Vortex generators cause, in particular, discrete eddies in the flow wake of the vortex generators, and thus effect efficient mixing of the boundary layer. This has the effect, in particular, that energetic layers are mixed with air layers in direct wall proximity that have already lost kinetic energy as a result of friction.

Preferably, the lift-generating element is a drag element, in particular an L-profile. The latter is preferably on the pressure side, and in particular preferably at an angle of 90° in relation to the local incident flow direction that prevails in the upper partial-load range of a wind turbine. The drag element in this case may be, for example, riveted, adhesive-bonded, screwed or welded on to the rotor-blade extension body. Accordingly, the vortex generators that are preferably to be used, or a vortex generator that is preferably to be used, may be adhesive-bonded, riveted, screwed or welded to the rotor-blade extension body.

The drag element, which is preferably an L-profile, may be, for example, bent in an uncomplicated manner from a metal sheet. Preferably in this case, one limb of the L-profile is attached to the rotor-blade extension body. The other limb preferably extends substantially radially outward in relation to the rotor-blade extension body.

Preferably, the lift-generating element is a profile attachment element, which is mounted, in the direction of air flow, on the downstream part of the rotor-blade extension body. A corresponding lift is thereby generated, in a manner similar to that of an aerodynamic profile of a rotor blade. This enables the energy yield, or the output yield of the wind turbine having the rotor-blade extension body, to be increased very efficiently.

Preferably, the profile attachment element is a spoiler, a profiled mount-on element having a sharp trailing edge, or a profiled mount-on element having a blunt trailing edge.

According to the invention, a rotor blade is provided with a rotor-blade extension body according to the invention.

Preferably, a wind turbine is provided with a corresponding rotor blade having rotor-blade extension bodies as described above.

According to the invention, a rotor-blade extension body according to the invention is used on a rotor blade of a wind turbine.

Further features of the invention are disclosed by the description of embodiments according to the invention in combination with the claims and the appended drawings. Embodiments according to the invention may fulfill individual features or a combination of a plurality of features.

BRIEF DESCRIPTION OF THE DRAWINGS

The invention is described in the following, without limitation of the general concept of the invention, on the basis of exemplary embodiments and with reference to the drawings, and reference is expressly made to the drawings in respect of all details according to the invention that are not explained more fully in the text. There are shown in:

FIG. 3, which is a schematic cross-sectional representation through a rotor-blade extension body according to the invention;

FIG. 4, which is a schematic sectional representation through a further embodiment of a rotor-blade extension body according to the invention;

Figure 1:
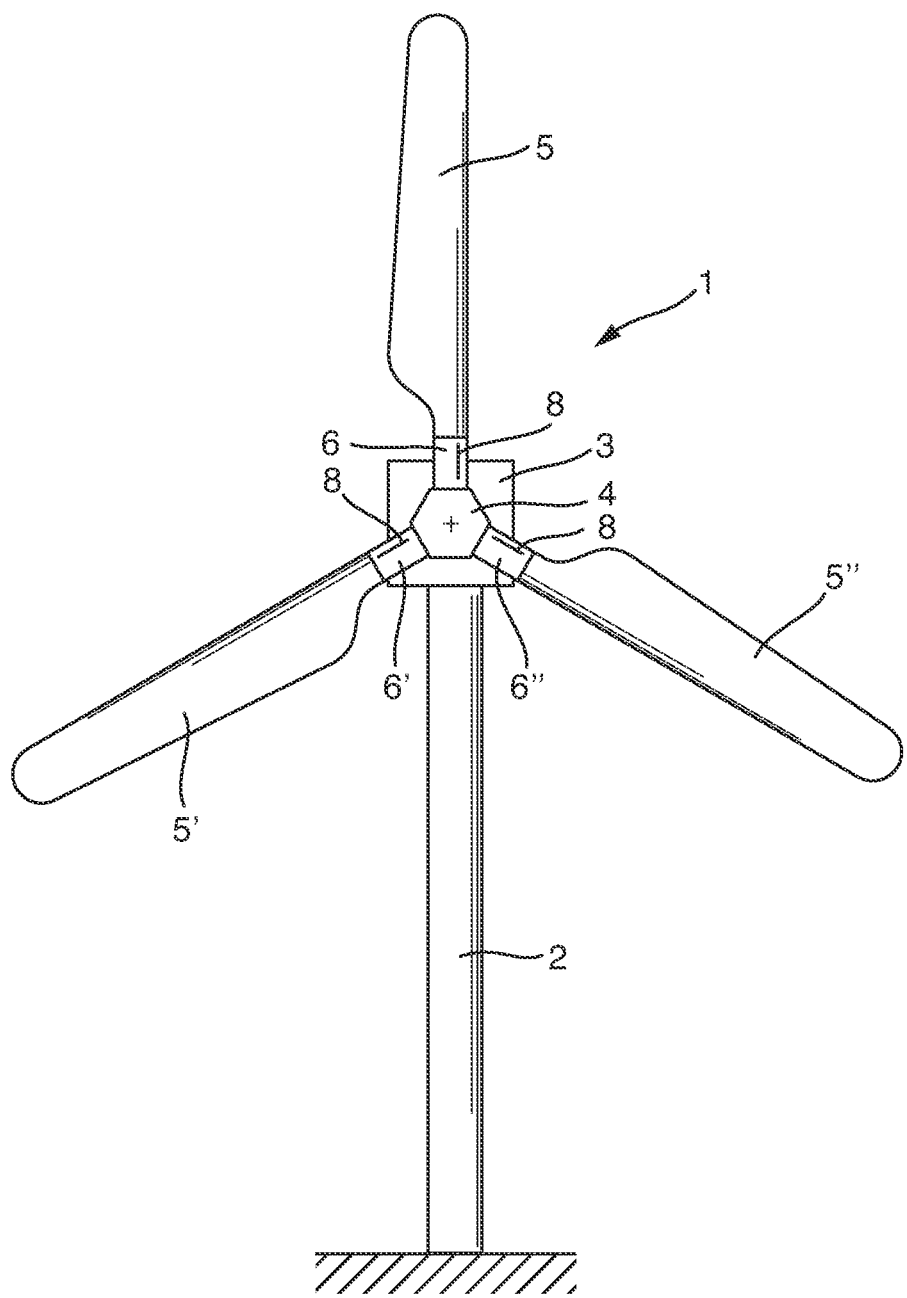
FIG. 1, which is a schematic view of a wind turbine according to the invention.

In the drawings, elements and/or parts that are the same or of the same type are in each case denoted by the same references, such that in each case they are not presented anew.

DETAILED DESCRIPTION OF THE INVENTION

FIG. 1 shows a schematic view of a wind turbine 1 according to the invention. The wind turbine 1 has a tower 2, which is erected on the ground. The tower 2 may be a tubular tower or a lattice tower. The wind turbine may also be installed offshore. Disposed on the tower 2 there is a nacelle 3, disposed in which, typically, there is a generator, which is connected, via a hub 4, to the rotor, comprising the rotor blades 5, 5', 5", of the wind turbine. Mounted between the rotor blades 5, 5', 5" and the hub 4 there are rotor-blade extension bodies 6, 6', 6". The latter may be connected, for example by means of conventional screwed connections on flanges, both to the hub and to the respective rotor blade. In respect of this, reference is made, for example, to WO 01/42647 A2.

In FIG. 1, the rotor has been provided with rotor blades 5, 5', 5" that have been set substantially, or completely, in respect of their pitch angle, such that the maximum energy yield can be extracted from the wind emanating from the front, i.e. from the direction of the viewer. This means that the rotor blades 5, 5' and 5", which have blade pitch control, are disposed such that the maximum surface area of the rotor blades has been set against the wind, and can extract the maximum energy from the wind. This is a rotor blade setting that is normally used in the upper partial-load range of a wind turbine. As the wind becomes stronger, the rotor blades are then adjusted accordingly, such that they are always turned further into the wind, until, in the case of a cut-out wind speed, they are adjusted to a feathering position. If the rotor blade setting in FIG. 1 were to be regarded as a 0° setting, the feathering position would be approximately 90°.

Figure 2:
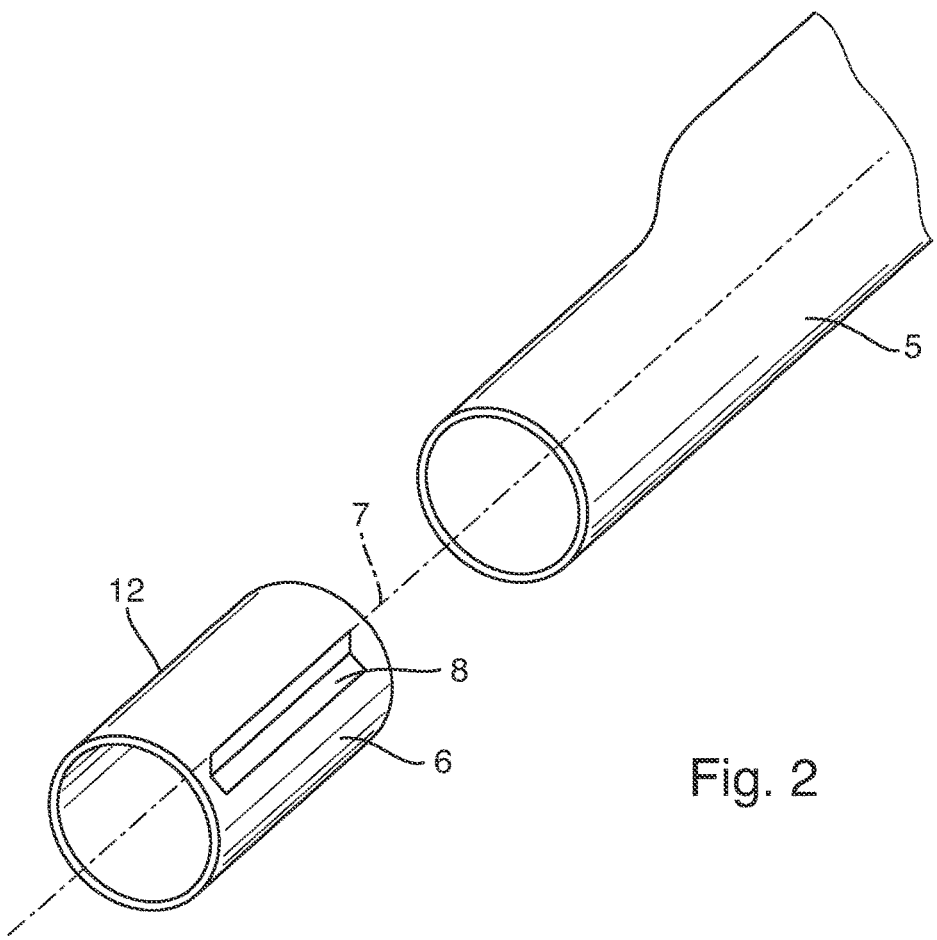
FIG. 2, which is a schematic three-dimensional representation of a rotor-blade extension body with a rotor blade.

Shown schematically in FIG. 2 is a three-dimensional representation of a rotor-blade extension body 6, which is of a cylindrical design and has a circumference 12. The rotor-blade extension body 6 is elongate, namely, along the longitudinal axis 7 of the rotor blade 5, the start of which is also shown schematically, in part, toward the rotor-blade root. Here, the rotor-blade extension body 6 and the rotor blade 5 are represented separately from each other. An L-body 8, or L-profile 8, is mounted as a drag element on the rotor-blade extension body. The drag element 8 is elongate, being substantially parallel to the longitudinal axis of the rotor-blade extension body.

Shown schematically in FIG. 3 is a sectional representation through a rotor-blade extension body 6 in a wind field. An air flow 20 flows on to the front region of the rotor-blade extension body 6. The drag of the rotor-blade extension body 6 causes a widening of the air flow 21. It is then ensured, by appropriate measures, that a correspondingly large lift force 22 is generated with the least possible drag 23. Thus, in this exemplary embodiment, for example, there is a vortex generator 9 mounted on the suction side 11, and on the pressure side 12 there is a drag element 8, in this case in the form of an L-profile. It may also be provided that only one of these two is used. Preferably, however, both elements are used simultaneously, since the effect can thus be optimized.

The vortex generator 9 is disposed on the suction side 11, in the direction of the air flow 20. The drag element 8 is preferably disposed at an angle of 90° in relation to the air flow direction, there being provided in this case an angle setting of the rotor blade, or of the rotor-blade extension body, that prevails in the upper partial-load range of a wind turbine.

FIG. 4 shows a further embodiment of a rotor-blade extension body 6 according to the invention, in a schematic sectional representation. Here, likewise, a vortex generator 9 has been provided. In addition, a profiled mount-on element, having a sharp trailing edge 14, has been mounted in the downstream part of the circumference 12 of the rotor-blade extension body 6. Alternatively, as represented by a broken line, a spoiler 13 may also be provided.

Figure 5:
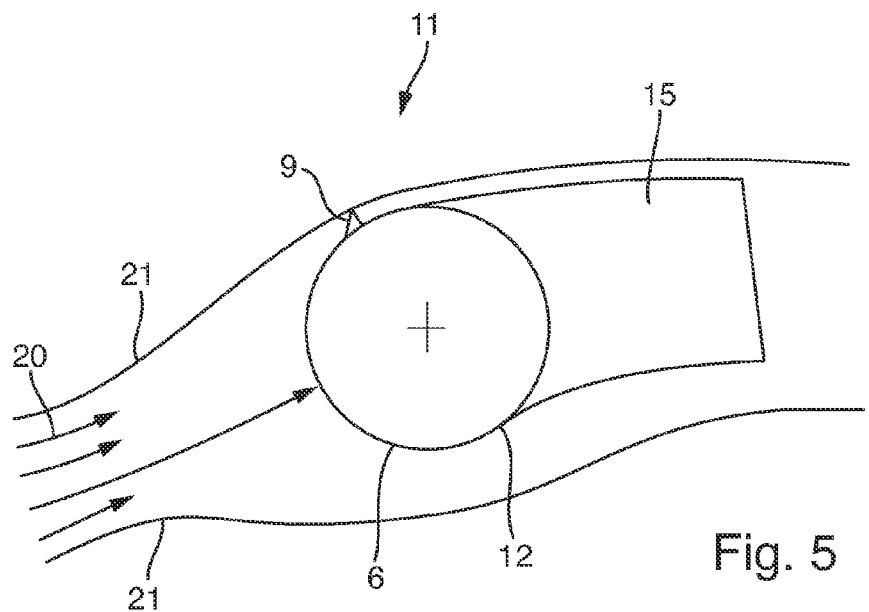
FIG. 5, which is a schematic sectional representation through another, further embodiment of a rotor-blade extension body according to the invention.

Shown schematically in FIG. 5 is a sectional representation of a further rotor-blade extension body according to the invention. In this case, there is a profiled mount-on element 15, having a blunt trailing edge, mounted on the downstream part of the circumference 12 of the rotor-blade extension body 6.

Provision of a spoiler, as a non-structural mount-on part of a trailing edge, or in the rear region of the rotor-blade extension body, increases the effective area for lift. Accordingly, use of a profiled mount-on element that has a sharp trailing edge or has a blunt trailing edge increases the lift. In particular, the effect is optimized here by use of a vortex generator 9.

Figure 6:
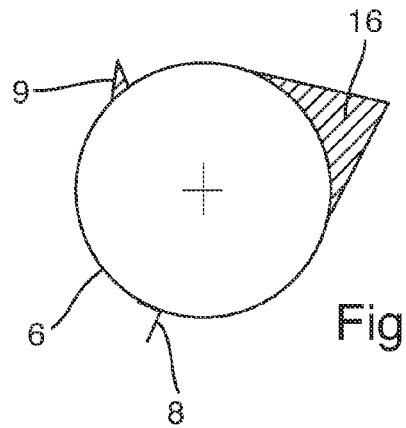
FIG. 6, which is a schematic sectional representation through a further embodiment of a rotor-blade extension body according to the invention.

Shown schematically in FIG. 6 is a sectional representation through a further embodiment of a rotor-blade extension body according to the invention. In this embodiment, both a vortex generator 9 and a drag element 8 have been provided. In addition, there is a suction-side extension body 16 provided on the suction side. In this exemplary embodiment, the suction-side extension body 16 constitutes substantially a tangential extension of the suction side, as a result of which the lift is increased.

Figure 7:
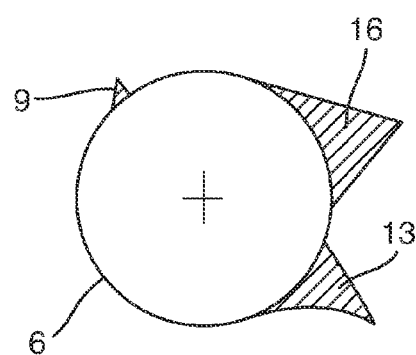
FIG. 7, which is a further schematic sectional representation through a further embodiment of a rotor-blade extension body according to the invention.

Shown schematically in FIG. 7 is another, further embodiment of a rotor-blade extension body 6 according to the invention. Apart from a vortex generator 9 and the suction-side extension body 16 already shown in FIG. 6, a spoiler 13 is additionally provided on the pressure side. In this exemplary embodiment, the spoiler 13 has been provided with a reflexed profile, in order to increase the lift yet further.

All stated features, including the features given solely by the drawings and also individual features that are disclosed in combination with other features, are considered to be essential for the invention, both singly and in combination. Embodiments according to the invention may be fulfilled by individual features or a combination of a plurality of features. Within the scope of the invention, features designated with "in particular" or "preferably" are to be understood as optional features.

List of reference numbers appearing in the accompanying drawing figures:

1 wind turbine
2 tower
3 nacelle
4 hub
5, 5', 5" rotor blade
6, 6', 6" rotor-blade extension body
7 longitudinal axis
8 drag element
9 vortex generator
10 pressure side
11 suction side
12 circumference
13 spoiler
14 profiled mount-on element having sharp trailing edge
15 profiled mount-on element having blunt trailing edge
16 suction-side extension body
20 air flow
21 air flow
22 lift force
23 drag force

What is claimed is:

1. A rotor-blade extension body mountable to a rotor-blade root of a rotor blade of a rotor of a wind turbine, wherein the rotor-blade extension body is elongate, wherein a lift-generating element is mounted, in a direction of air flow, on a downstream part of a circumference of the rotor-blade extension body, and wherein the lift-generating element is a profiled mount-on element having a blunt trailing edge, and wherein the rotor-blade extension body further comprises an eddy generator on a suction side of the rotor-blade extension body.

2. The rotor-blade extension body as claimed in claim 1, wherein the eddy generator is a vortex generator.

3. The rotor-blade extension body as claimed in claim 1, further comprising a spoiler.

4. A rotor blade including a rotor-blade extension body as claimed in claim 1.

5. A wind turbine including a rotor blade as claimed in claim 4.

* * * * *